United States Patent
Koga (10) Patent No.: US 6,725,987 B2
(45) Date of Patent: Apr. 27, 2004

(54) GEAR PARKING BRAKE OF A POWER TRANSMISSION DEVICE

(75) Inventor: Hidetaka Koga, Fujisawa (JP)

(73) Assignee: Isuzu Motors Limited, Tokyo (JP)

(*) Notice: Subject to any disclaimer, the term of this patent is extended or adjusted under 35 U.S.C. 154(b) by 21 days.

(21) Appl. No.: 10/123,608

(22) Filed: Apr. 16, 2002

(65) Prior Publication Data

US 2002/0153208 A1 Oct. 24, 2002

(30) Foreign Application Priority Data

Apr. 19, 2001 (JP) .................................. 2001-121300

(51) Int. Cl.[7] .............................................. B60K 41/24
(52) U.S. Cl. ..................................... 192/3.24; 192/3.23
(58) Field of Search .............................. 192/3.25, 3.26, 192/3.27, 3.52, 3.54, 3.55, 3.56, 3.57, 3.61, 3.62, 3.63, 219.4, 3.23, 3.39, 3.24

(56) References Cited

U.S. PATENT DOCUMENTS

| | | | | |
|---|---|---|---|---|
| 3,163,271 A | * | 12/1964 | Hilpert | 192/3.25 |
| 3,810,532 A | * | 5/1974 | Schuppel | 477/54 |
| 4,177,886 A | * | 12/1979 | Hiraiwa et al. | 192/219.5 |
| 4,437,550 A | * | 3/1984 | Nozawa | 192/3.24 |
| 5,183,138 A | * | 2/1993 | Jolliff | 192/219.4 |
| 5,687,611 A | * | 11/1997 | Sin et al. | 74/411.5 |
| 5,782,326 A | * | 7/1998 | Souza | 192/3.26 |
| 5,862,717 A | * | 1/1999 | May et al. | 74/730.1 |
| 5,924,534 A | * | 7/1999 | Okubo | 192/3.24 |
| 6,382,379 B2 | * | 5/2002 | Yoshimoto et al. | 192/3.25 |

* cited by examiner

*Primary Examiner*—Saul Rodriguez
(74) *Attorney, Agent, or Firm*—McCormick, Paulding & Huber LLP (57) ABSTRACT

Provision of a new gear parking brake of a power transmission device that enables the simple achievement of in-gear parking.

A gear parking brake (31) of a power transmission device has a fluid coupling (4) positioned on the engine side and a friction clutch (5) positioned on the transmission (2) side, arranged in series. This gear parking brake (31) is provided with a brake mechanism on an input shaft (3) of the transmission (2), which activates at the time of parking. Even though the friction clutch (5) becomes disengaged, the rotation of the input shaft (3) of the transmission (2) is restricted, thereby enabling in-gear parking.

9 Claims, 6 Drawing Sheets

GEAR PARKING BRAKE OF A POWER TRANSMISSION DEVICE

REFERENCE TO PRIOR APPLICATIONS

This application is entitled to the benefit of and incorporates by reference essential subject matter disclosed in Japanese Patent Application No. 2001-121300 filed on Apr. 19, 2001.

BACKGROUND OF THE INVENTION

1. Field of the Invention

The present invention relates to a power transmission device for transmitting power from the engine of heavy motor vehicles such as trucks and buses to the transmission, comprising a fluid coupling and a friction clutch, and more particularly to a gear parking brake enabling in-gear parking.

2. Description of the Related Art

Conventionally, a power transmission device that uses a fluid coupling in combination with a wet multiplate friction clutch has been proposed as a power transmission device for transmitting power from the engine of heavy motor vehicles such as trucks and buses to the transmission.

Figure 5:
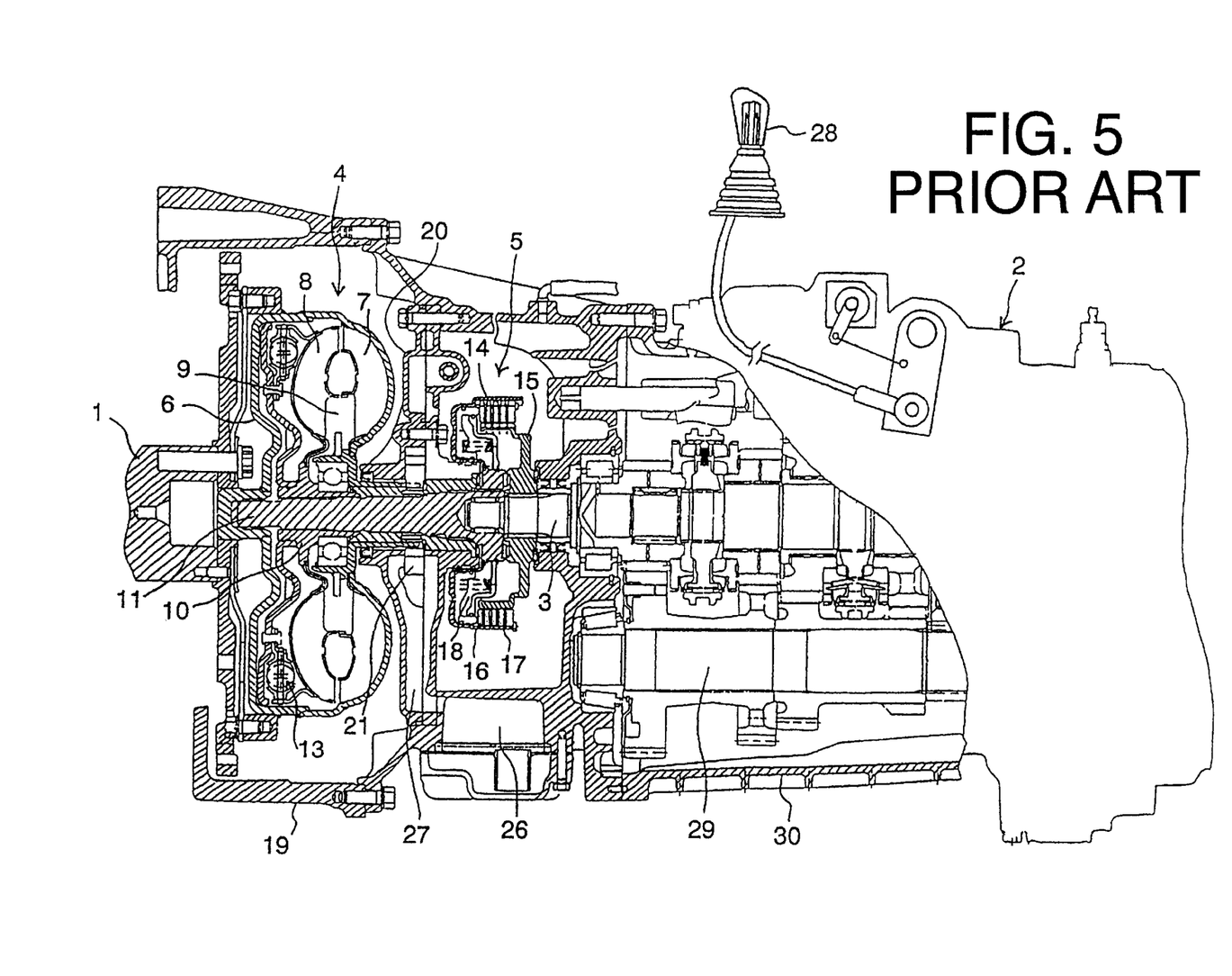
FIG. 5 is a sectional view showing one example of a conventional power transmission device.

As shown in FIG. 5, this power transmission device has a fluid coupling 4 and a wet multiplate friction clutch 5 joined between the engine's crankshaft 1 and input shaft 3 of the transmission 2, so as to be able to connect and disconnect. This enables smooth gear change and reliable power transmission to be achieved without it being necessary for the driver to operate the clutch.

The basic structure and application of a conventional power transmission device having this kind of structure will be described below.

First, in the same way as a well-known conventional fluid coupling, the fluid coupling 4 mainly consists of a pump shell 7 fixed to the engine's crankshaft 1 through a casing 6, a turbine shell 8 positioned opposite the pump shell 7, and a stator 9 fixed therebetween. The torque of the crankshaft 1 is delivered from the pump shell 7 through the fluid filled therein to the turbine shell 8, and the torque of the turbine shell 8 is transmitted to an output shaft 11 that is connected to the wet multiplate friction clutch 5, through a hub 10. Further, a lock-up mechanism 13 (to be described later) activated by a fluid-activated mechanism 12 is formed between the casing 6 and the turbine shell 8, and when the engine speed reaches a prescribed speed, the crankshaft 1 and output shaft 11 are directly linked through the above mechanisms and efficient power transmission is achieved.

Next, the wet multiplate friction clutch 5 comprises a clutch outer 14 spline fitted to the output shaft 11, and a clutch center 15 mounted to the input shaft 3 of the transmission 2. In the same way as in a conventional wet multiplate friction clutch, a plurality of friction plates 16 formed on the inside of the clutch outer 14 and a plurality of friction plates 17 formed on the outside of the clutch center 15 are made to come into contact with each other, thereby transmitting the power of the output shaft 11 to the input shaft 3 of the transmission 2. Further, this wet multiplate friction clutch 5 contains a connection and disconnection mechanism 18 activated by a fluid-activated mechanism 12, which will be described later, and when the engine is started or the gears are changed, the clutch outer 14 and the clutch center 15 disengage and the power between the output shaft 11 and the input shaft 3 is cut off.

Figure 6:
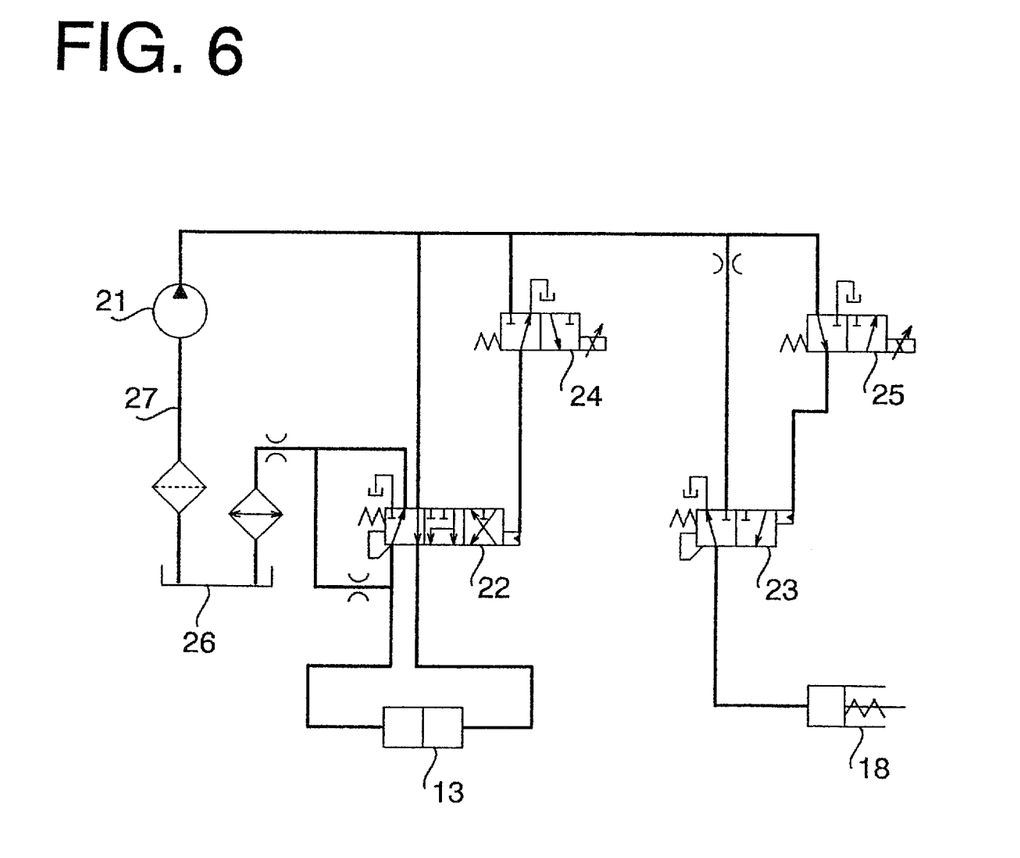
FIG. 6 is a hydraulic circuit view of a conventional power transmission device.

Further, the fluid-activated mechanism 12 that operates this lock-up mechanism 13 of the fluid coupling 4 and the connection and disconnection mechanism 18 of the wet multiplate friction clutch 5 mainly consists of a hydraulic pump 21 formed inside an intermediate wall 20 of a joint housing 19 that contains the above-mentioned fluid coupling 4 and wet multiplate friction clutch 5; a lock-up mechanism control valve 22 and a connection and disconnection mechanism control valve 23 activated by the operating oil discharged from the hydraulic pump 21 as shown in FIG. 6; and electromagnetic selector valves 24 and 25 to control the activation and shutoff of these control valves 22 and 23. As shown in FIG. 5, this hydraulic pump 21 operates the whole time that the engine is running, accompanying the rotation of the pump shell 7 of the fluid coupling 4, and it sucks in the operating oil that is pooled in the operating oil retention space 26 at the bottom of the joint housing 19 through a suction passage 27. The operating oil is sent to the above-mentioned lock-up mechanism control valve 22 and the clutch connection and disconnection mechanism control valve 23 and either activates these valves or after passing through is returned back into the operating oil retention space 26 in a cycle. Further, the electromagnetic selector valves 24 and 25 that activate the lock-up mechanism valve 22 and the connection and disconnection mechanism control valve 23 are each controlled by control signals from a controller consisting for example of a micro-computer (not shown in the drawings).

In a power transmission device having this kind of construction, first, when the engine starts up, the lock-up mechanism 13 of the fluid coupling 4 and the connection and disconnection mechanism 18 of the wet multiplate friction clutch 5 are both turned to a disconnected (OFF) state. Therefore, in the fluid coupling 4 a state of so-called creep occurs, the power from the engine's crankshaft 1 is cut off by the wet multiplate friction clutch 5, and is not transmitted to the input shaft 3 of the transmission 2. Next, from this state when the driver shifts the transmission 2 into gear to move the vehicle, the controller, which receives this signal, activates the electromagnetic selector valve 25 and the clutch connection and disconnection mechanism control valve 23. Accordingly the connection and disconnection mechanism 18 is activated by the operating oil discharged from the hydraulic pump 21, and by connecting the wet multiplate friction clutch 5, the power from the output shaft 11 is transmitted to the transmission 2 through the input shaft 3 and the vehicle begins to move. In such a way, the engine's power is transmitted to the transmission 2 and the vehicle starts moving, and when a prescribed speed is reached, the driver then operates a shift lever 28 to shift the transmission 2 up to second gear, third gear and so on in order to further increase the speed of the vehicle. However, each time the driver shifts up to a higher gear, it is automatically controlled so that the instant that the driver operates the shift lever 28 this is detected by the controller and the wet multiplate friction clutch 5 is momentarily cut off. Then, after the shift to the next gear has been completed the wet multiplate friction clutch 5 is automatically reconnected, and thus smooth upshift is achieved. Further, at the same time, when the vehicle has reached a prescribed speed, the lock-up mechanism 13 of the fluid coupling 4 is activated by an electromagnetic control valve 24, which is also activated by the controller. By directly connecting the crankshaft 1 and the output shaft 11, power from the engine's crankshaft 1 is transmitted to the transmission 2 without loss.

However, in a vehicle with a power transmission device having this kind of construction, so-called in-gear parking cannot be achieved. In other words, when the engine 1 is stopped in order to park, the hydraulic pump 21 for engaging the wet multiplate friction clutch 5 is inactivated and the wet multiplate friction clutch 5 is automatically disengaged. Therefore, whatever gear the transmission 2 is put into, the wet multiplate friction clutch 5 just runs idle and the engine brake does not work, meaning that the vehicle cannot be put into a definite stop.

Further, the side brake that is ordinarily used when parking a motor vehicle is not always able to be used and is prone to certain inconveniences, for example the brake wire may freeze in cold temperatures and not be able to be unfrozen, or the wire that activates it may snap.

For these reasons, methods such as forming a multiplate disc-type countershaft brake on the end of the countershaft 29 of the transmission 2, and restricting the torque of the countershaft 29 so as to enable in-gear parking, have been considered. However, under this method a linking hole linking to the wet multiplate friction clutch 5 is opened to the casing 30 of the transmission 2 and it is necessary to extend the end of the countershaft 29 to the wet multiplate friction clutch 5. Therefore, certain disadvantages arise, for example gear oil inside the transmission 2 may leak out from the linking hole, and it is also necessary to secure a space in which to form the multiplate disc-type countershaft brake on the wet multiplate friction clutch 5. In addition, when a gear parking brake function is imposed on the countershaft brake, due to the relationship between the transmission's reduction gears it is necessary to ensure that the brake power is greater than the reduction gears (about 1.8 times), and this requires countershaft brakes to be larger and take up a greater space.

SUMMARY OF THE INVENTION

Therefore, the present invention was designed to effectively resolve these sorts of problems. An object of the present invention is to provide a new gear parking brake of a power transmission device that enables in-gear parking to be easily achieved.

In order to resolve the above-mentioned problems, as shown in claim 1, the present invention is a gear parking brake of a power transmission device having a fluid coupling positioned on the engine side and a friction clutch positioned on the transmission side, arranged in series, comprising a brake mechanism on an input shaft of the above-mentioned transmission, which activates at the time of parking. Accordingly, even though the friction clutch becomes disengaged when the engine is stopped, the torque of the transmission's input shaft at the time of parking can be restricted, thereby enabling so-called in-gear parking.

More specifically, as shown in claim 2, the above-mentioned brake mechanism comprises: a friction plate that revolves together with the input shaft; a pressure plate provided on the transmission housing so as to move towards and away from the friction plate; and a pressure piston provided on the transmission housing side so as to pressure weld the friction plate to the pressure plate. In other words, when the friction clutch becomes disengaged when the engine stops, the friction plate and the pressure plate are welded together by the pressure piston and the torque of the transmission's input shaft is restricted, thereby enabling in-gear parking when the transmission has been put into any gear.

Further, as shown in claim 3, the brake mechanism may comprise a brake drum integrally formed on the transmission's input shaft; a brake band provided so as to be able to expand and contract, and to encircle the circumference of the brake drum; and a tightening mechanism to shorten the diameter of the brake band and tighten the brake drum. In other words, when the engine is stopped, the transmission's input shaft is tightened by the brake band and the rotation is controlled, thereby enabling in-gear parking when the transmission has been put into any gear.

Further, as shown in claim 4, if the brake drum is integrally formed in the clutch center of the friction clutch, which is formed on the input shaft of the transmission, it can be easily mounted without requiring a particularly large amount of space.

Further, as shown in claim 3, when one end of the brake band is attached to the clutch housing of the friction clutch and the other end is positioned on the brake drum, simply by pressing that end to the brake drum using the tightening mechanism, the brake band's diameter can easily be shortened and the brake drum can be securely tightened.

Further, as shown in claim 4, by forming this tightening mechanism from a hydraulic pump that is activated by the engine's power and a piston that is moved up and down by the oil pressure of this hydraulic pump and shortens the brake band's diameter, at the time that the engine is stopped and the oil pressure drops, the piston projects out so as to shorten the diameter of the brake band, thereby enabling automatic activation of the mechanism simultaneous with the engine stopping, without requiring any special operation.

DESCRIPTION OF THE PREFERRED EMBODIMENTS

Next, a preferred embodiment of the present invention will be described with reference to the attached drawings.

Figure 1:
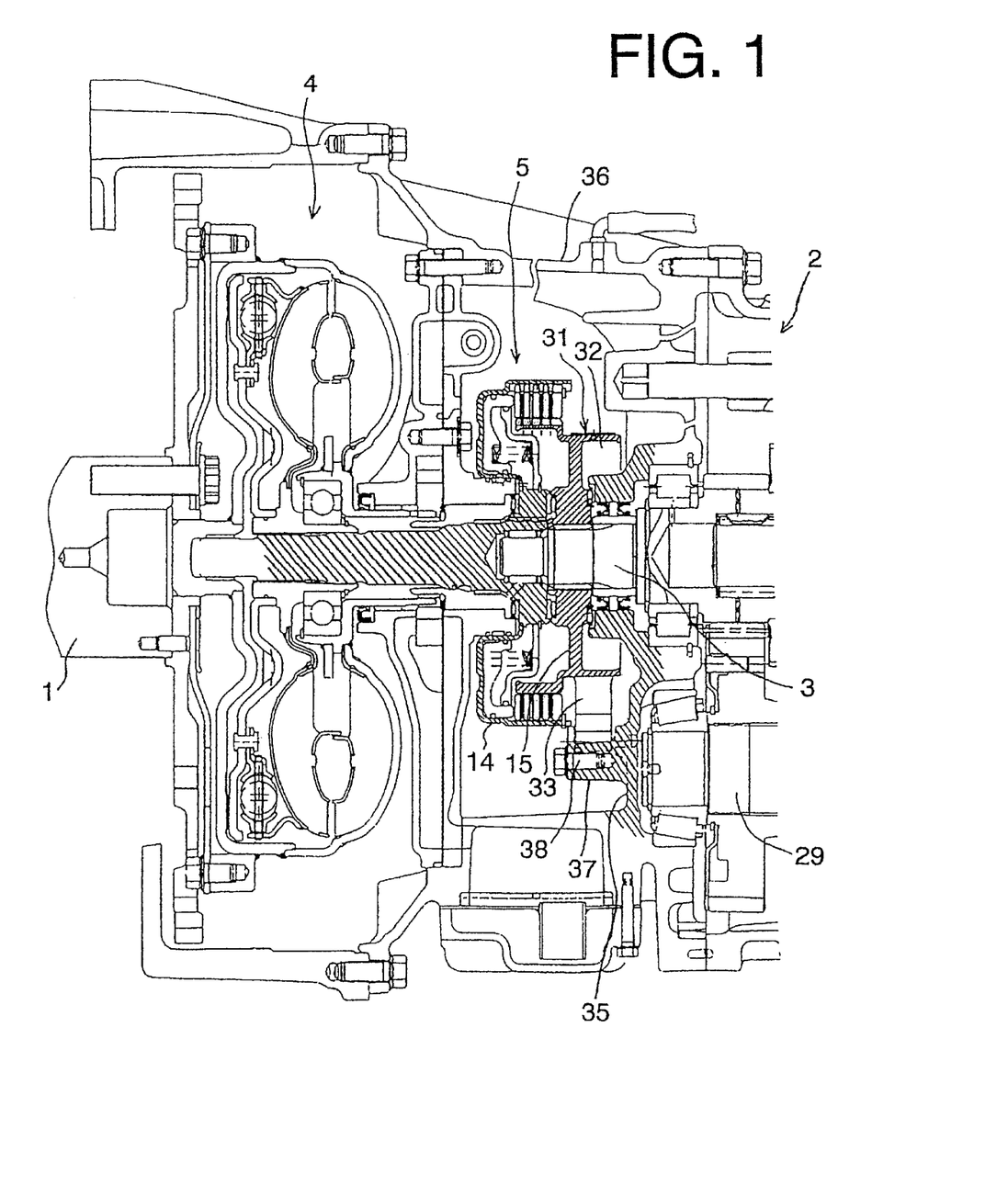
FIG. 1 is a sectional view showing the first embodiment of a gear parking brake of a power transmission device according to the present invention.
Figure 2:
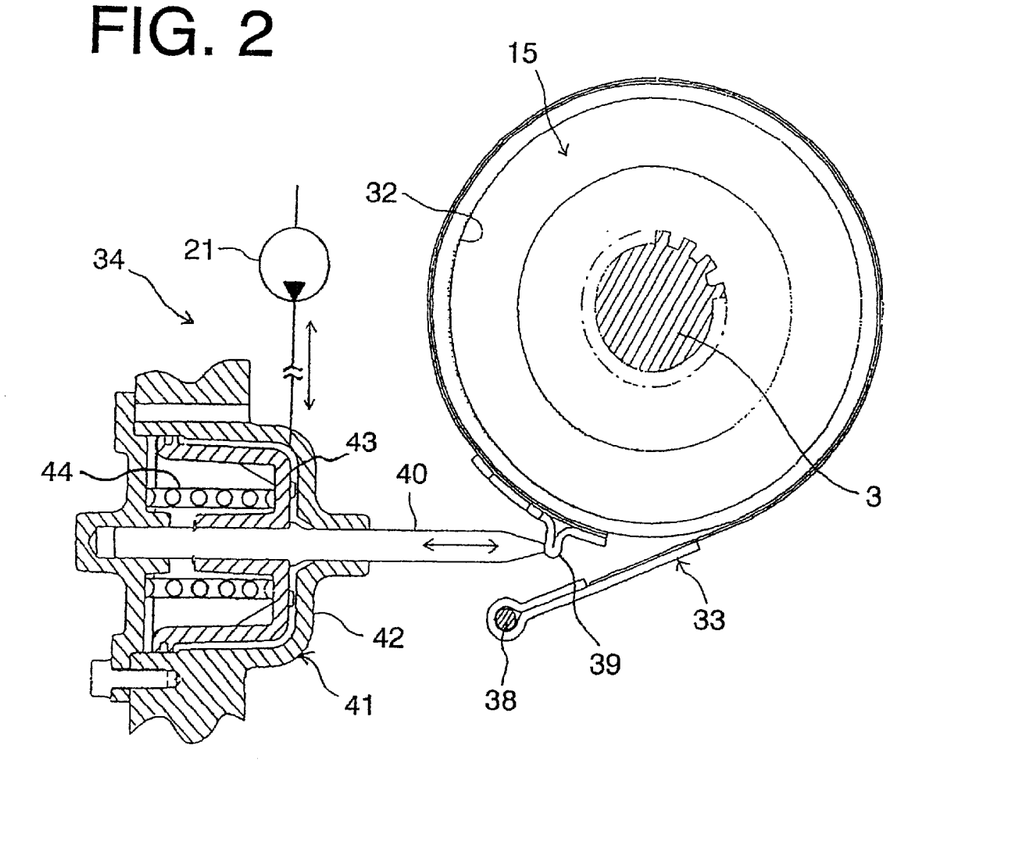
FIG. 2 is a compositional view showing the first embodiment of a gear parking brake according to the present invention.

FIG. 1 and FIG. 2 show the first embodiment of a gear parking brake 31 of a power transmission device, according to the present invention. In FIG. 1, reference numeral 4 depicts the fluid coupling positioned on the engine's crankshaft 1 as described above, and reference numeral 5 depicts the wet multiplate friction clutch positioned on the input shaft 3 of the transmission 2.

As shown in the drawings, this gear parking brake 31 is formed proximate to the wet multiplate friction clutch 5, and comprises a brake drum 32 formed on the input shaft 3 of the transmission 2 on the same axis; a brake band 33 formed so as to encircle the circumference of the brake drum 32; and a tightening mechanism 34 to shorten the diameter of the brake band 33 and tighten the brake drum 32.

This brake drum 32 is a cylinder integrally formed in a clutch center 15 of the wet multiplate friction clutch 5 that is spline fitted to the input shaft 3 of the transmission 2, so as to protrude therefrom into the transmission 2. The brake drum 32 accompanies the revolution of the clutch center 15 and revolves together with the input shaft 3.

The brake band 33 consists of a metal band that is able to expand and contract, and one end thereof is joined to a dividing wall 35 that divides the wet multiplate friction clutch 5 from the transmission 2. In other words, it is pin-joined by a mounting bolt 38 to the mounting part 37 of a clutch housing 36 enclosing the wet multiplate friction clutch 5. Further, as shown in FIG. 2, the other end of this brake band 33 is freely positioned on the brake drum 32, and an engaging projection 39 formed on the tip of this brake band 33 is engaged by the tip of a plunger 40 of a hydraulic piston 41 of the tightening mechanism 34 to be described next.

As described before, this tightening mechanism 34 consists of a hydraulic pump 21 activated by the engine's power and the hydraulic piston 41 activated by the hydraulic pump 21. By projecting out the plunger 40, which is engaged with the engaging projection 39 of the released end of the brake band 33, tangentially to the brake drum 32, the brake band 33 is pressed onto the brake drum 32 so as to tighten the brake drum 32.

More specifically, this hydraulic piston 41 contains a piston 43 integrated with the plunger 40 inside a cylinder 42 mounted to the clutch housing 36, and a coil spring 44 that impels the piston 43 in the direction of the brake band 33. The hydraulic piston 41 injects operating oil from the hydraulic pump 21 into this cylinder 42 and by moving the piston 43 in the opposite direction to the brake band 33 (to the left in the drawing), the brake band 33 is loosened. Conversely, when the pressure of the operating oil in the cylinder 42 is released, the piston 43 is moved in the direction of the brake band 33 (to the right in the drawing) by the force of the coil spring 44 and the brake band 33 goes into a tightened state.

Figure 3:
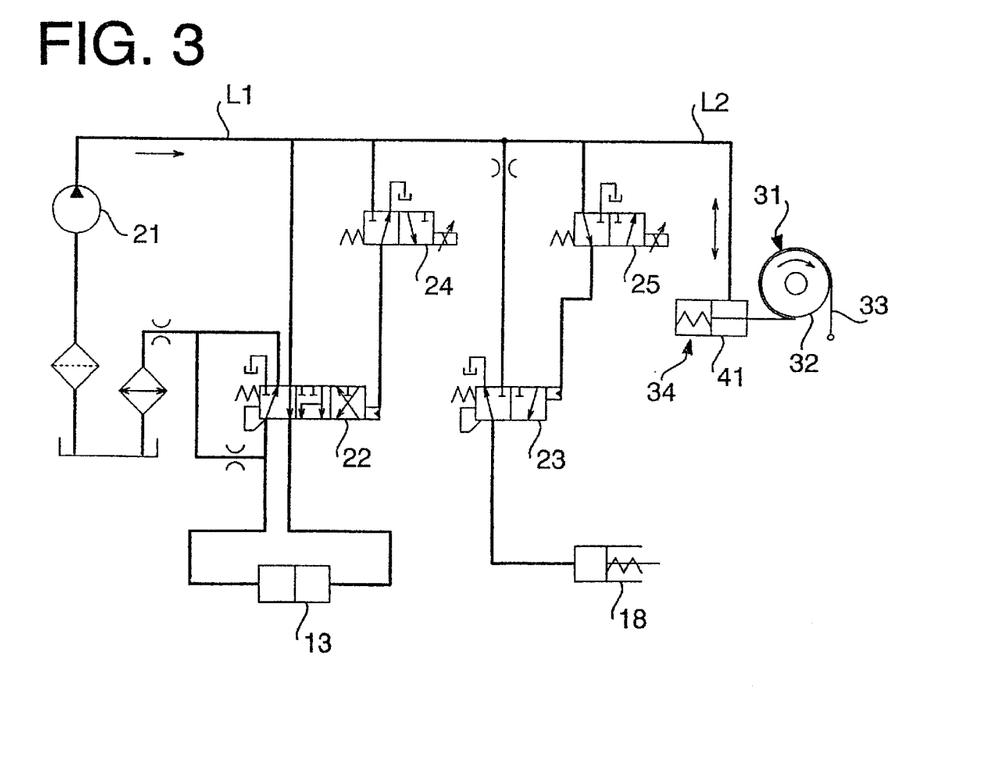
FIG. 3 is a hydraulic circuit view showing the operation of a gear parking brake according to the present invention.

FIG. 3 shows the relationship between the gear parking brake 31 of the present invention and the hydraulic pump 21. In the present invention, as described before, the operating oil line L1 that is connected to the lock-up mechanism control valve 22 and the connection and disconnection control valve 23 connects to a branch line L2. By sending one portion of the operating oil to the hydraulic piston 41 of the tightening mechanism 34 through the branch line L2, the hydraulic piston 41 becomes activated.

Further, in the gear parking brake 31 of the present invention having this kind of structure, when the engine starts up, the piston 43 of the hydraulic piston 41 is pushed back by the oil pressure from the hydraulic pump 21 that is being driven continuously. Since the piston 43 loses its ability to press the brake band 33 onto the brake drum 32, the brake drum 32 revolves smoothly together with the clutch center 15 of the multiplate friction clutch 5, without there being friction between the brake band 33 and the brake drum 32. Therefore power transmission from the clutch center 15 to the input shaft 3 of the transmission 2 can be achieved without loss.

On the other hand, from this state, when the engine is stopped the hydraulic pump 21 also stops and the oil pressure to the pressure piston 41 drops. Since the piston 43 is pushed out by the force of the coil spring 44, the brake band 33 is pressed onto the brake drum 32, and acts to tighten the brake drum 32, resulting in the occurrence of a strong frictional force between the brake band 33 and the brake drum 32, and the torque of the brake drum 32 is restricted.

Accordingly, since the torque of the input shaft 3 of the transmission 2 is also restricted, at the time of parking, if the engine is stopped while the transmission 2 is in gear, the torque of the drive source downstream thereof is restricted and so-called in-gear parking is enabled.

More specifically, the gear parking brake 31 according to the present invention uses one portion of oil pressure from the hydraulic pump 21 that is in constant activation together with the engine drive, and loosens the brake band 33. When the engine stops and the oil pressure from the hydraulic pump 21 is no longer applied, since the brake band 33 naturally tightens due to the force of the coil spring 44, compared to using a conventional multiplate disc-type countershaft brake, the present invention has a simple construction and is able to exert a reliable gear brake function. Further, since it is no longer necessary to extend the end of the countershaft 29 through the clutch housing 36 to the wet multiplate friction clutch 5, the seal of the dividing wall 35 is maintained. In addition, a smaller amount of force can be used to restrict the torque than that used to restrict the torque of the countershaft 29 from the relationship between the gear ratios, for example, thereby enabling a more reliable in-gear parking.

Note that if a vehicle is being towed when the engine is stopped, if the gear of the transmission 2 is put into neutral, even though the rotation of the input shaft 3 is restricted by the brake band 33, since the power transmission in the transmission 2 between the input shaft 3 and the vehicle axle is cut off, smooth towing can be achieved without any problems arising.

Figure 4:
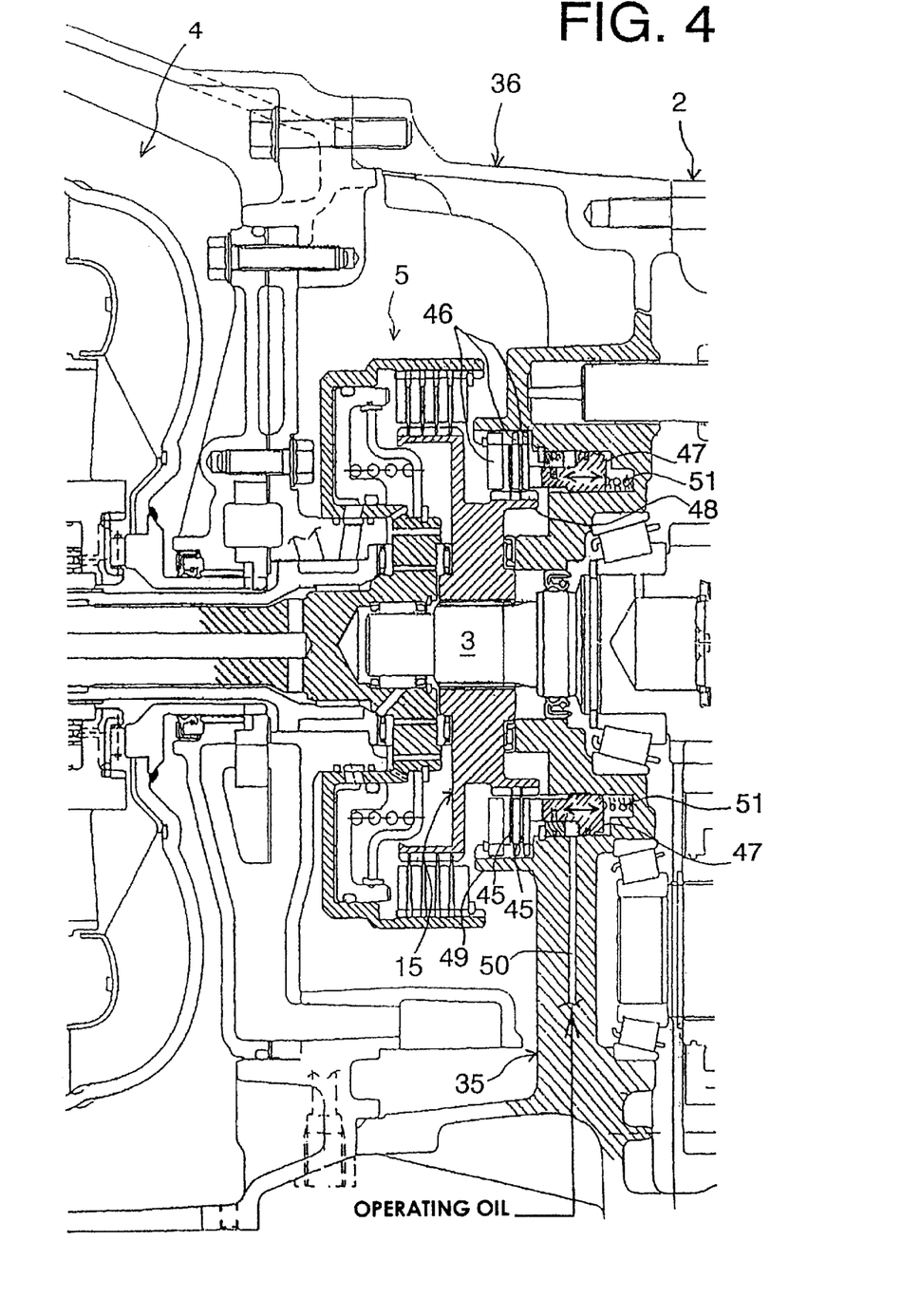
FIG. 4 is a sectional view showing the second embodiment of a gear parking brake according to the present invention.

Next, FIG. 4 shows a gear parking brake 31 of a power transmission device according to the second embodiment of the present invention.

As shown in the drawing, the present embodiment comprises two friction plates 45 and 45 on the input shaft 3 of the transmission 2 described before, which to be more specific, are formed on a clutch center 15 of the wet multiplate friction clutch 5 formed on the input shaft 3. The present embodiment also comprises three pressure plates 46, 46 and 46 positioned between and to the front and back of these friction plates 45 and 45, and a pressure piston 47 to pressure weld the friction plates 45 and 45 and the pressure plates 46, 46 and 46 to each other.

These friction plates 45 and 45 are each spline fitted to a drum 48 that extends from the clutch center 15 to the transmission 2 in the same way as a friction plate 17 that forms one part of the wet multiplate friction clutch 5. They revolve together with the drum 48 and are able to be moved along same in the axial direction.

Further, these pressure plates 46, 46 and 46 are positioned so as to overlap the front and back of the area where the friction plates 45 and 45 are moved, in the same way as the one friction plate 16 which comprises a part of the wet multiplate friction clutch 5. They are also spline fitted to the inside of a mounting drum 49 formed on the dividing wall 35 of the clutch housing 36. In relation to the axial direction of the input shaft 3, they are able to move towards and away from the friction plates 45 and 45, however their rotation is restricted by the mounting drum 49.

Meanwhile, a pressure piston 47 on the dividing wall 35 of the clutch housing 36 is formed in the mounting drum 49, and by protruding from the surface of the dividing wall 35 towards the wet multiplate friction clutch 5 due to the force of a coil spring 51, it pressure welds the friction plates 45 and 45 and the pressure plates 46, 46 and 46 to each other. Conversely when the pressure piston 47 retracts inside the dividing wall 35, due to operating oil supplied from an operating oil passage 50 formed in the same dividing wall 35, the friction plates 45 and 45 and the pressure plates 46, 46 and 46 disengage from each other. Note that the operating oil supplied from the operating oil passage 50 is supplied from the hydraulic pump 21 that works together with the engine, in the same way as in the above embodiment.

Therefore, in the gear parking brake 31 according to the present embodiment having this kind of structure, when the engine is running, the pressure piston 47 is pulled back into the dividing wall 35 of the clutch housing 36 by operating oil supplied from the hydraulic pump 21, and since the friction plates 45 and 45 mounted to the input shaft 3 and the pressure plates 46, 46 and 46 mounted to the dividing wall 35 are in a free state in relation to each other, the rotation of the input shaft 3 is not restricted by these, and power transmission from the wet multiplate friction clutch 5 through the input shaft 3 to the transmission 2 can be achieved smoothly.

On the other hand, at the time the vehicle is being parked, the driver disengages the wet multiplate friction clutch 5, and when the engine is turned off in an in-gear state, (in other words with one of the gears of the transmission 2 in gear), the supply of operating oil from the hydraulic pump 21 also stops, and there is no force to pull the pressure piston 47 back into the dividing wall 35. Therefore the pressure piston 47 protrudes out in the direction of the wet multiplate friction clutch 5 because of the stretching force of the coil spring 51 formed in the dividing wall 35, and acts to pressure weld the friction plates 45 and 45 and the pressure plates 46, 46 and 46 to each other.

Consequently, the rotation of the input shaft 3 is restricted and even though the wet multiplate friction clutch 5 is disengaged, the input shaft 3 stops revolving and in-gear parking is enabled in the same way as the above embodiment.

Accordingly, in the present embodiment, in the same way as the above embodiment, compared to using a conventional multiplate disc-type countershaft brake, the present invention has a simple construction and is able to exert a reliable gear brake function. Further, the seal of the dividing wall 35 can be maintained and a smaller amount of force can be used to restrict the rotation, thereby enabling more reliable in-gear parking.

In addition, for its lubrication, since the gear parking brake 31 according to the present invention is formed in the moist chamber containing the wet multiplate friction clutch 5, the ATF oil used for the wet multiplate friction clutch 5 and the fluid coupling 4 can be used in that state for lubrication, and this can prevent reduction of the brake power created by lubricative defects.

In summary, the present invention can produce the superior effects described below.

1. A brake drum is formed on the input shaft of the transmission, and this brake drum is automatically tightened by a brake band when the engine stops, thereby enabling in-gear parking when the transmission has been put into gear, even though the engine has stopped and the friction clutch is disengaged, because the rotation of the input shaft is restricted.
2. Further, in comparison to a conventional multiplate disc-type countershaft brake, the structure is comparatively simple, and since for example the sealability of the transmission is maintained, the present invention contributes to improving the reliability of the whole power transmission device as well as the reliability of the parking brake.
3. In addition, since the gear parking brake according to the present invention is formed as a whole in the moist chamber containing the wet multiplate friction clutch, the ATF oil used for the wet multiplate friction clutch and the fluid coupling can also be used for lubrication of the gear parking brake; this can prevent reduction of the brake power created by lubricative defects.

What is claimed is:

1. A gear parking brake of a power transmission device having a fluid coupling positioned on the engine side and a friction clutch positioned on the transmission side, arranged in series, comprising a brake mechanism on an input shaft of said transmission, which activates at the time of parking.

2. The gear parking brake of a power transmission device according to claim 1, wherein said brake mechanism comprises:
   a friction plate that revolves together with said input shaft;
   a pressure plate provided on the clutch housing side so as to move towards and away from said friction plate; and
   a pressure piston provided on said transmission housing side so as to pressure weld said friction plate to said pressure plate.

3. The gear parking brake of a power transmission device according to claim 1, wherein said brake mechanism comprises:
   a brake drum provided on the input shaft side of said transmission integrally therewith;
   a brake band formed so as to be able to expand and contract, and encircle the circumference of said brake drum; and
   a tightening mechanism to shorten the diameter of said brake band and tighten said brake drum.

4. The gear parking brake of a power transmission device according to claim 3, wherein said brake drum is provided integrally on the clutch center of a friction clutch provided on the input shaft side of said transmission.

5. The gear parking brake of a power transmission device according to claim 4, wherein one end of said brake band is attached to the clutch housing of said friction clutch and the other end is positioned on said brake drum.

6. The gear parking brake of a power transmission device according to claim 4, wherein said tightening mechanism comprises:
   a hydraulic pump that is activated by the power of the engine; and
   a piston that projects out when the oil pressure of said hydraulic pump drops, and shortens the diameter of said brake band.

7. The gear parking brake of a power transmission device according to claim 3, wherein one end of said brake band is attached to the clutch housing of said friction clutch and the other end is positioned on said brake drum.

8. The gear parking brake of a power transmission device according to claim 7, wherein said tightening mechanism comprises:
   a hydraulic pump that is activated by the power of the engine; and
   a piston that projects out when the oil pressure of said hydraulic pump drops, and shortens the diameter of said brake band.

9. The gear parking brake of a power transmission device according to claim 3, wherein said tightening mechanism comprises:
   a hydraulic pump that is activated by the power of the engine; and
   a piston that projects out when the oil pressure of said hydraulic pump drops, and shortens the diameter of said brake band.

* * * * *